United States Patent Office 3,067,104
Patented Dec. 4, 1962

3,067,104
STABLE FAT-SOLUBLE VITAMIN
COMPOSITIONS
Melvin Hochberg, and Charles Ely, Livingston, N.J.,
assignors to Nopco Chemical Company, Harrison, N.J.,
a corporation of New Jersey
No Drawing. Filed Sept. 17, 1958, Ser. No. 761,467
8 Claims. (Cl. 167—81)

This invention relates to new and improved vitamin products and to a method for preparing such products. More particularly, the invention relates to highly stable fat-soluble vitamin-containing compositions which are characterized especially by the greatly enhanced biological availability and/or effectiveness of the vitamins contained therein.

The many and diverse problems associated with the fortification of stock and poultry feeds with fat-soluble vitamins, as well as those associated with the vitamin fortification of foods for human consumption, have been given considerable attention by researchers in recent years. The primary purpose of the research in this field is, and has been, to develop a supplement capable of providing vitamins in a stable, yet completely bioligically available, form. Great strides have been made toward achieving this aim. As but one example of a recently developed class of products whose properties approach the desired result, reference can be made to those products disclosed in U.S. Patent 2,777,798 of Hochberg and MacMillan. This patent discloses and claims products comprised of a multiplicity of small, solid, spheroidal shaped particles each consisting essentially of (1) a normally solid wax-like material, (2) a fat-soluble vitamin-containing material, (3) an edible surface active agent and (4) an edible antioxidant. While products such as these, as well as certain others disclosed in the prior art, have been proven to be stable and biologically available, improved products are still being sought. A particular aim of the continuing research in this field is to provide a vitamin-containing feed supplement in which the vitamins are even more readily available and effective biologically.

It is the object of this invention to provide a stable and biologically available and effective vitamin product.

It is a more particular object of the invention to provide a stable vitamin product which, as compared to the products of the prior art, has greatly enhanced biological availability and effectiveness.

Other objects of the invention will be obvious and will, in part, appear hereinafter.

We have discovered that, when certain polysaccharides are formulated in combination with a normally solid wax-like material, a fat-soluble vitamin-containing material, an edible surface active agent and an edible antioxidant, into a product comprising a multiplicity of small substantially solid, spheroidal shaped particles, a stable product is obtained which possesses greatly enhanced biological availability and effectiveness.

In general, any polysaccharide which is hygroscopic in nature, but which is, at the same time, generally considered to be non surface active, that is, devoid of any tendency to materially alter the surface tension of an aqueous solution, can be used in the practice of the invention. Synthetic polysaccharides, as well as those processed from natural sources, have been found to be well suited for use. In the production of the preferred products of the invention, a class of synthetic polysaccharides is used. The synthetic polysaccharides which we prefer to employ are a class of compounds sold commercially under the trademark Polyose by Corn Products Sales Company, New York, New York. These synthetic polysaccharides are powdery products which are soluble in water and insoluble in many organic solvents. However, polysaccharides which have been processed from natural sources, as, for example, alignate, agar, kelp, Irish moss, etc. and derivatives thereof, are fully as well suited for use. Where, however, a derivative of a polysaccharide is used, for example, an algin derivative, such as, an alginate salt, the derivative employed should be one which is not, in and of itself, destructive of the vitamin ingredient or ingredients of the product. Calcium alignate has been found to be especially well suited for use. Other polysaccharides which have been processed from natural sources are also suitable for use. Gums, which strictly speaking are not true polysaccharides, but which like polysaccharides yield monoses, can also be used. Such gums, however, must be hygroscopic and substantially devoid of any surface active properties. Suitable for use are gums such as gum ghatti, guar gum, etc.

In general, any normally solid wax-like material having a melting point above about 45° C. can be employed in the practice of this invention. Wax-like materials which are suitable for use include glycerides, or other fatty acid esters, fatty acids, vegetable waxes, petroleum waxes, etc. If desired, mixtures of two or more of these can be employed. Thus, for example, glycerides derived from animal, vegetable, marine and marine animal sources can be used as the wax-like ingredient of our products. Included among these are hydrogenated oils having a melting point above about 45° C. such as, hydrogenated coconut, cottonseed, peanut, soybean, menhaden, sardine oils, etc. Fatty acids having a melting point above 45° C. such as, stearic acid, palmitic acid, etc., and mixtures thereof, can be used. Natural mixtures of fatty acids which comprise and are derived from hydrogenated glycerides are also suitable for use. Vegetable waxes, as, for example, carnauba wax, ouricury wax, etc., are well suited for use in the practice of the invention. When, however, a fatty material, such as, a glyceride, fatty acid, vegetable wax, etc. is used as the normally solid wax-like ingredient of the product, we prefer to employ a material having a relatively low iodine value, that is, an iodine value of from 0 to 10, and preferably not greater than 5. A mineral wax, such as any of the commercially available microcrystalline waxes, are used in producing the preferred products of the invention.

One may use any of the natural, or artificially produced, vitamin A or vitamin D as the source of the vitamins in the practice of the invention. Activated sterols, such as, ergosterol or irradiated 7-dehydrocholesterol, vitamin A in ester or alcohol forms, vitamin A which has been produced by synthetic methods, fish oils, fish liver oils, vitamin concentrates prepared from such oils, etc. can be employed. However, if desired, precursors of vitamin A, such as, carotene, can be used in the production of our products in place of vitamin A. The fat-soluble vitamin material which is employed in the practice of the invention should be such that, when mixed with the normally solid wax-like materials, in the proportions which will be specified hereinafter, and heated above the melting point of the mixture, the resulting mass will be liquid. Moreover, the molten liquid mass containing among other ingredients the vitamin component of the product must be such that, when cooled to room temperature, it will be substantially solid and uniform throughout and, in the form of what may be termed a solid solution. The vitamin products of the invention which are carriers for vitamin A preferably have a potency of at least 1000 units of vitamin A per gram. Moreover, the products of the invention which are carriers for vitamin D preferably have a potency of at least 100 units of vitamin D per gram.

In general, any edible surface active agent can be employed in carrying out the invention. As it appears throughout this specification and in the claims, the term "edible" is used to denote a compound which can be eaten either by animals or by humans in the amounts specified herein without any deleterious effect resulting therefrom. Among the many surface active agents which can be used in the practice of the invention are those enumerated in U.S. Patent 2,777,798. These include, among others, esters prepared by the reaction of polyethylene glycols having a molecular weight of from about 200 to about 4000 with fatty acids containing from 8 to 22 carbon atoms. Polyethylene glycol fatty acid esters prepared from fatty acids which are saturated, unsaturated or hydroxylated, as, for example, caprylic acid, capric acid, lauric acid, myristic acid, palmitic acid, oleic acid, ricinoleic acid, stearic acid, hydroxy stearic acid, arachidic acid, behenic acid and mixtures thereof are fully suitable for use. In addition, surface active agents of the type produced by esterifying sorbitans or mannitans with a fatty acid containing from 8 to 22 carbon atoms, or a mixture of such fatty acids, can be used. Polyethylene oxide addition products of the aforementioned sorbitan or mannitan esters can likewise be used as the surface active component of our products. In the preferred embodiment of the invention, however, lecithin is the surface active agent used and it, like the other surface active agents mentioned herein, can be employed either alone or in combination with some other edible surface active agent.

Any one of many edible antioxidants can be used in the practice of this invention. Suitable for use are edible antioxidants, such as, propyl gallate, butylated hydroxy anisole, butylated hydroxy toluene, gallic acid, nondihydroguaiaretic acid, etc. and mixtures thereof. In addition to these, however, one may use other edible antioxidants, as, for example vitamin E, mixed tocopherols and natural antioxidants of the types disclosed and claimed in U.S. Patents No. 2,345,576, No. 2,345,578, No. 2,433,593 and No. 2,434,790. Natural antioxidants of the type which are produced by the processes disclosed and claimed in U.S. Patents No. 2,396,680 and No. 2,396,681 as well as other similar edible antioxidants, can be employed also. Mixtures of such antioxidants can be used, if desired. In fact, a mixture of butylated hydroxy anisole and butylated hydroxy toluene is used in producing the preferred products of the invention. In addition, one can employ the antioxidants in admixture with compounds which act as synergists therefor, that is, with compounds which have little, if any, effect, in and of themselves, as antioxidants but which exert a synergistic action upon the antioxidant. Included among such compounds are lecithin, critic acid, alkyl phosphates, etc.

In addition to the aforementioned essential ingredients, one may incorporate vegetable flours into the products of the invention. Among the many vegetable flours which can be employed are finely ground soybean meal, corn germ meal, cottonseed meal, linseed meal, wheat germ meal, corn meal, alfalfa leaf meal, wheat bran, oat meal, peanut meal, bolted rice polish, wheat flour, soya flour, etc. The vegetable flour, when used, should consist of finely divided particles, the majority of which will pass through a 60 mesh screen. The vegetable flours used in the preferred embodiment of the invention are such that a majority of the particles thereof will pass through a 100 mesh screen. While this ingredient need not be used in the practice of the invention, a vegetable flour is employed in producing the preferred products thereof.

The quantities of the various ingredients used in producing our products can be varied. Broadly, the products can be varied. Broadly, the products of the invention will contain from about 10.0% by weight to about 70.0% by weight of the normally solid wax-like material. The preferred products of the invention will contain, however, from about 20% by weight to about 30% by weight of the normally solid wax-like material.

The exact amount of surface active agent which should be employed in any particular instance will depend, to some extent at least, upon the particular surface active agent selected for use. Moreover, the amount of surface active agent to be used will be influenced by the identity and the quantity of polysaccharide compound to be used. It has not been determined definitely why the products or our invention possess such a very high degree of biological availability and effectiveness. It does appear, however, as though the enhanced availability of the product is attributable directly to the combined presence of the surface active agent and the polysaccharide in the product. Broadly, our invention includes within its scope, products which contain as little as 0.5% by weight and as much as about 60.0% by weight of surface active agent. Moreover, the invention encompasses products containing as much as about 35.0% by weight and as little as about 0.5% by weight of the polysaccharide. In general, we have found that the biological availability and effectiveness of the products of the invention is considerably enhanced when the combined weights of the surface active agent and the polysaccharide comprise at least about 20.0% of the weight of the product. Thus, where a relatively small amount of surface active agent is used, for example, 0.5% by weight, in the formulation of our products, the presence of a large quantity of polysaccharide in the product, for example, at least about 20.0% by weight, will bring about the desired result. Greater quantities of polysaccharide, that is up to about 35% by weight thereof or somewhat lesser quantities thereof could be used in such instances if desired, however. Moreover, where a relatively large amount of surface active agent is to be incorporated into the product, that is, up to about 60% by weight thereof, smaller quantities of the polysaccharide, as, for example, 0.5% by weight will be sufficient to accomplish the result desired. Greater quantities of polysaccharide, for example, up to about 35% by weight thereof or somewhat lesser quantities could be used without changing materially the properties of the product. Broadly, the invention encompasses products in which the combined weight of surface active agent and polysaccharide is within the range of from about 20% to about 80% of the total weight of the product.

As indicated heretofore, the products of the invention are particles which are substantially solid. Since the combined weights of the surface active agent and the polysaccharide can comprise such a large portion of each particle of product, the quantities of those components which are used in any particular instance must be such as to permit a substantially solid product to be produced. This is particularly true where a surface active agent such as lecithin is in use. Lecithin, of course, is a partly fluid waxy mass. If used in too great a quantity, the physical properties of the final product would be adversely affected. Seldom, if ever, would one attempt to incorporate more than about 50.0% by weight of lecithin into the product. A produce containing more than about 50.0% of lecithin would, in all probability, be too soft for its intended use. In general, however, we have found that irrespective of the identity of the surface active agent and polysaccharide in use, products which are completely satisfactory in every respect are obtained when the surface active agent comprises from about 35.0% to about 45.0% by weight and the polysaccharide comprises from about 15.0% by weight to about 20.0% by weight of the product to give a product the combined weight of the polysaccharide and surface active agent therein being from about 55% to about 60% by weight.

Furthermore, only relatively small quantities of edible antioxidant need be used. While it is preferred to employ at least about 0.05% by weight of antioxidant, seldom, if ever, will it be necessary to incorporate more than 1.5% by weight thereof into our products. Finally, the amount of vegetable flour which is incorporated into the preferred compositions of the invention can be varied. Seldom, if ever, will it serve any useful purpose to use more than about 15% by weight, based on the weight of the product of vegetable flour. Products containing from 7.0% by weight to 10.0% by weight are the preferred products of the invention.

The products of our invention are readily prepared. The normally solid wax-like material is heated to a temperature above its melting point. The fat soluble vitamin-containing material, the edible surface active material, the edible antioxidant and the polysaccharide can then be added in sequence to the molten wax-like material. In preparing the preferred products of the invention, where a vegetable flour is also employed, that ingredient is added to and admixed with the melted wax-like material. The order in which the ingredients are admixed is not of critical importance. For example, rather than adding the ingredients to the molten mass in sequence, one could first prepare a mixture of all of the ingredients of the product, except the wax-like material, and add the mixture to the molten wax or add the molten wax to the mixture.

The fluid mass that will be obtained by any of these procedures will contain all of the components substantially uniformly distributed with respect to each other. While in this fluid condition at elevated temperature, the mass is converted, by any convenient or practical means, into droplets or globules whose temperature is reduced to convert them to the solid spheroidal shaped particles desired. These particles, resembling very small beads, have the wax-like material, the vitamin-containing material, the edible surface active agent, the edible antioxidant and the polysaccharide in what, in general, may be termed solid solution as a continuous phase or matrix. Where a vegetable flour has been used, it will be suspended as discrete particles in each spheroidal particle of the solid solution formed by the other ingredients.

In general, solid particles in the desired spheroidal shape can be obtained by either one of two methods. For convenience, the first of these methods will be referred to as the "centrifugal" process while the second will be referred to as the "spraying" process. In the "centrifugal" process, the molten mixture of ingredients, described in the preceding paragraph, is broken up into a multiplicity of small solid spheroidal particles by the application thereto of a centrifugal force. This can be accomplished using any suitable apparatus. Thus, for example, one could introduce the molten mixture into a rapidly rotating vessel, the sides of which contain numerous small perforations or alternatively the molten mixture could be caused to flow upon a rapidly rotating plate or disc. As the vessel rapidly rotates, the melted mixture will be forced to flow out of the perforations in the side of the vessel or off the plate or disc and will be broken up into a multiplicity of very small spheroidal particles. These particles which are liquid when they leave the vessel, cool very rapidly as they pass through an inert atmosphere, for example, air, or an atmosphere of carbon dioxide or nitrogen and by the end of such passage they will have substantially solidified. Under practically all conditions it will be found that these solid particles will be practically perfect spheres. In some cases, the particles will not be true spheres but they will be so nearly so that they are properly described as being spheroidal in shape. The "spraying" process is, however, used in preparing the preferred products of the invention. This process involves the passage of the molten mixture under pressure, through an orifice to break up the molten mass into liquid particles. As the finely subdivided liquid particles pass through an inert atmosphere after being forced through the orifice, they cool rapidly and form solid spheroidal particles, which are entirely comparable to those obtained by the centrifugal method heretofore described. In both the centrifugal process and the spraying process, the temperature of the melted mixture of ingredients should be such that the mixture flows readily. When the apparatus in use necessitates the flow of the mixture through an orifice, the temperature of the mixture must be such that it will do so without tending to clog up the orifice whether it be the perforations in a rotating vessel or the openings in the spray device. The speed at which the centrifugal apparatus is rotated may vary, of course, but we have found that a rotation of from about 200 to about 1500 revolutions per minutes will give very satisfactory products. The pressure which is used in the various types of spraying devices can vary to some extent, of course. In general, however, sufficient pressure will be required to cause the hot liquid mixture to be broken up into very small droplets. These droplets cool quite rapidly as they pass through an inert atmosphere, forming a multiplicity of small solid spheroidal particles. The spray device may conveniently be located near the ceiling of a room having a rather high ceiling or it may be located near the top of a tall tower with the nozzle of the spray device being directed downwardly. However, such an arrangement is not necessary and if desired, one may locate the spray device on or near the floor of the room in which the spray device is placed. The nozzle of the spray device is then directed so that the initial path of the droplets will be at least parallel to the floor of the room or at an angle slightly above a line parallel with the floor of the room. Of course, in such a case the pressure which is employed in forcing the hot liquid mixture through the spray device will have to be high enough to cause the small droplets which are formed to travel through the atmosphere for a distance sufficient to allow the droplets to solidify substantially before they fall to the floor of the room. In most cases it is preferred either that the spray device be placed so that the droplets will have a free fall from the nozzle of the spray device to the floor of the room of from about 15 to 20 feet or more or that sufficient pressure be employed in the spray device to force the droplets through the air for a similar distance before they fall to the floor of the room. The centrifugal apparatus or the spray device employed should be such as to give under the operating conditions disclosed herein, spheroidal particles, a majority of which will pass through a 10 mesh screen but will not pass through a 100 mesh screen.

In certain cases, the spheroidal particles which are obtained will be free flowing and will not tend to adhere to each other by any appreciable extent. In other cases, for example, where the product contains a large proportion of lecithin, it will be found that the spheroidal particles do have a tendency to adhere somewhat to each other. Such tendency may be readily overcome by dusting these particles with a vegetable flour such as one of the vegetable flours used in preparing the preferred compositions of our invention.

The products of our invention are outstanding for a number of reasons. In the first place, the products are highly stable. The vitamins in the products are protected indefinitely against oxidative deterioration caused by atmospheric moisture and storage at rather high temperatures. Moreover, by virtue of our invention, the vitamins are provided in a form in which they are protected against the destructive influences of the minerals with which they are ultimately associated in the animal or poultry feed. However, the most noteworthy feature of our products is their greatly enhanced biological availability and effectiveness. Based on studies which we have conducted, it has been ascertained that the products of the invention are twice as available and effective, biologically, to the chick as vitamin A from fish liver oil or vitamin A palmitate in the oil form. Moreover, this result was not altered when the present products were compared with products produced by mixing the fish liver oil or vitamin A palmitate in oil form with an antioxidant and dispersing same in a vegetable carrier. When the products of the present invention were compared with such a product it was found that our products were more than twice as available to the chick. Chicks receiving low levels of vitamin A, that is 200, 400, 600 and 1200 U.S.P. units per pound of feed, used the vitamin supplied by the products of this invention twice as effectively as they used the vitamin supplied by fish liver oil or vitamin A palmitate. This quantitative relationship was established using growth, feed efficiency, prevention of deficiency symptoms and prevention of mortality as the criteria. At medium to high levels, that is, levels of 800 to 6000 U.S.P units of vitamin A per pound of feed, where liver storage is the criterion, the products of the present invention produced twice the liver storage when compared to vitamin A supplied by fish liver oil or vitamin A palmitate. Liver storage is the most important factor in any study where practical levels of vitamin A are fed. However, liver storage is not appreciable until chicks receive higher levels, for example, 1200 or more U.S.P. units per pound of feed, of vitamin A.

For a fuller understanding of the nature and the objects of the invention, reference may be had to the following examples which are given merely as further illustrations of the invention and are not to be construed in a limiting sense. All parts given in the examples are parts by weight unless otherwise indicated. All vitamin potencies given in the examples are expressed in U.S.P. units unless otherwise indicated. As used throughout the present specification and claims, the word "hygroscopic" has been employed to denote a polysaccharide having an affinity for water, that is, having a tendency to absorb water thereby becoming dissolved or colloidally suspended therein.

*Example I*

A biologically available and effective dry carrier for vitamin A was prepared by first melting 36.36 parts of a microcrystalline wax having a melting point of about 88° C. to 90° C., and then adding thereto 4.92 parts of vitamin A palmitate having a potency of 1,000,000 units of vitamin A per gram, 32.72 parts of lecithin, 0.165 part of butylated hydroxy anisole, 0.835 part of butylated hydroxy toluene and 25.0 parts of Polyose D, a synthetic polysaccharide sold under that name by Corn Products Sales Company. Polyose D is a white to light tan colored powdery product produced by the controlled and catalyzed polymerization of special corn sugars. It is soluble in water and insoluble in organic solvents. In the form of a 10% aqueous solution it has a pH of not less than 3.5 and in the form of a 40% solids solution in water it has a viscosity of 20 to 100 poises at 70° F. The microcrystalline wax employed was a product sold under the trade name "Be Square Amber Wax" by the Bareco Oil Company.

While in a molten state at a temperature slightly above the melting point of the wax, the mixture was charged into a rapidly rotating cylindrical vessel which had relatively small size holes in the side thereof. The rotation of the vessel caused the molten mixture to pass through these holes as individual, small size droplets. As they were projected through the air, these droplets solidified to form small, substantially solid spheroidal shaped particles. These particles were dusted with soya flour using about one part of flour for each two parts of spheroidal shaped product.

The particles were assayed for their vitamin A content and they were found to contain 46,500 units of vitamin A per gram. The stability of the vitamin A in the product was then determined by an accelerated storage test. This test involved the storage of the product in an incubator exposed to a constant temperature of 37° C. The product was assayed once again after one month exposure and after two months exposure and it was found that during the two month period no essential loss in potency occurred.

The product of this example was tested for its biological effectiveness and availability as follows: two separate lots of one day old New Hampshire cockerel chicks, the lots comprising 10 chicks each, were fed a basal diet to which had been added the product of this example. A sampling of birds in the same lot from which these were taken revealed that, on the average, these chicks contained 86 units of vitamin A per total weight of liver before being placed on the test diet. The product of the example, on the basis of its assayed vitamin A potency, was added to the feed in such quantities as to provide a level of 4,800 units of vitamin A per pound of feed. The chicks were provided with this vitamin supplemented feed and with water, ad libitum, for a period of 14 days. At the end of that time, the livers were removed from four representative birds in each of the two lots. The freshly removed livers were analyzed for vitamin A content by the method of Gallup and Hoefer described in Ind. Eng. Chem. (Anal. Edition), 18, 288 (1946). This test revealed the storage of an average of 285 units of vitamin A in the total liver. This represented the storage of 72.0 units of vitamin A per gram of liver.

For comparative purposes, another product was prepared in precisely the same manner as was the product of the example. The formulation for this product differed from that of the product of the example in that Polyose "D" was omitted and replaced entirely with 25.0 parts of soya flour.

The product thus prepared was evaluated for biological effectiveness in the same manner as was the product of the example. Liver storage tests revealed that, on the average, 249 units of vitamin A were stored by the chicks in the liver. This represented the storage of 58.8 units of vitamin A per gram of liver.

The foregoing comparative results demonstrated that the product of the example was especially characterized by its enhanced biological availability and effectiveness. Whereas chicks fed the diet containing the product of the example showed a storage increase of 199 units of vitamin A per total liver, those chicks which were fed the product containing no Polyose D showed an increase in storage of only 163 units of vitamin A per total liver.

*Example II*

In this example, another biologically available and effective dry carrier for vitamin A was prepared. The procedure employed in the preparation of the product of Example I was repeated in every detail. The formulation of this product was as follows:

| | Parts |
|---|---|
| Vitamin A palmitate (1,000,000 units) | 4.92 |
| Lecithin | 42.42 |
| Be Square Amber Wax | 26.66 |
| Soya flour | 8.34 |
| Polyose D | 16.66 |
| Butylated hydroxy toluene | 0.835 |
| Butylated hydroxy anisole | 0.165 |

The product of this example was stable and it was evaluated for biological availability and effectiveness by the same procedure used in evaluating the product of Example I. Analysis revealed the storage of an average of 371 units of vitamin A in the total liver. This represented the storage of 95.4 units of vitamin A per gram of liver.

The foregoing results demonstrated the greatly enhanced biological availability of the product of this example.

*Example III*

In this example, a biologically available and effective dry carrier for vitamin A was prepared by first melting 26.66 parts of "Be Square Amber Wax" and adding thereto 4.92 parts of vitamin A palmitate having a potency of 1,000,0000 units of vitamin A per gram, 2.0 parts of lecithin, 0.165 part of butylated hydroxy anisole, 0.830 part of butylated hydroxy toluene and 33.333 parts of Polyose D. Thereafter, 32.092 parts of soya flour were added to the molten mixture.

This mixture was formed into a multiplicity of small substantially solid spheroidal shaped particles by the process described in Example I. The product was stable and it had the same excellent biological availability and effectiveness characteristics as the product of the foregoing examples. Liver storage data was obtained by the test method described in Example I. It was found that an average of 430 units of vitamin A were stored in the liver of the chicks. This represented the storage of 109 units of vitamin A per gram of liver.

The foregoing result conclusively demonstrated that the product of this example was especially characterized by superior biological availability and effectiveness.

*Example IV*

A biologically available and effective dry carrier for vitamin A was prepared by first melting 26.66 parts of "Be Squire Amber Wax" and adding thereto 4.92 parts of vitamin A palmitate having a potency of 1,000,000 units of vitamin A per gram, 2.0 parts of lecithin, 0.165 part of butylated hydroxy anisole, 0.830 part of butylated hydroxy toluene, 33.333 parts of guar gum and 32.092 parts of soya flour.

This molten mixture was formulated into small, solid spheroidal particles by the method described in Example I. A stable and biologically available and effective product was obtained. The product's availability and effectiveness was determined by the liver storage test referred to in Example I. Analysis revealed the storage of 430 units of vitamin A in the total liver of the chicks. This represented the storage of 115 units of vitamin A per gram of liver. These results indicated that the product of this example was characterized by superior biological availability and effectiveness characteristics.

*Example V*

In this example, a biologically available and effective dry carrier for vitamin A was prepared by melting 36.66 parts of "Be Square Amber Wax" and adding thereto 4.92 parts of vitamin A palmitate having a potency of 1,000,000 units of vitamin A per gram, 20.0 parts of glyceryl monostearate, 0.165 part of butylated hydroxy anisole, 0.830 part of butylated hydroxy toluene and 33.333 parts of Polyose D. Therefore, 4.092 parts of soya flour was added to the molten mixture.

This mixture was formed into a multiplicity of small substantially solid spheroidal shaped particles by the process described in Example I. The resulting dry carrier product was stable and it had the same excellent biological availability and effectiveness characteristics as the products of the foregoing examples.

*Example VI*

In this example, a biologically available and effective carrier for vitamin A was prepared by first melting 26.66 parts of "Be Square Amber Wax" and adding thereto 4.92 parts of vitamin A palmitate having a potency of 1,000,000 units of vitamin A per gram, 20.0 parts of lecithin, 0.830 part of butylated hydroxy toluene, 0.165 part of butylated hydroxy anisole and 33.333 parts of Polyose D. Thereafter, 32.092 parts of soya flour were added to the molten mixture.

The product was obtained in the form of small, substantially solid spheroidal shaped particles by the method described in Example I. The biological availability and effectiveness of the product was determined by the test method described in Example I. Liver storage tests revealed that, on the average, 300 units of vitamin A were stored by the chicks in the liver. This represented the storage of 77.7 units of vitamin A per gram of liver.

These results demonstrated that the product of the example was characterized by superior biological availability and effectiveness.

Having described our invention, what we claim as new and desire to secure by Letters Patent is:

1. A stable fat-soluble vitamin-containing composition in which the fat-soluble vitamin is readily available biologically, said composition comprising a multiplicity of small, substantially solid spheroidal particles comprising (a) a normally solid wax-like material having a melting point of at least 45° C., (b) a fat-soluble vitamin containing material selected from the group consisting of a fat-soluble vitamin A-containing material, fat-soluble vitamin D-containing material and mixtures thereof, (c) an edible surface active material, (d) an edible antioxidant and (e) a hygroscopic polysaccharide which is substantially devoid of surface active properties and which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, said substances, (a), (b), (c), (d) and (e) being intimately combined with each other, said composition having been produced by forming (a), (b), (c), (d) and (e) into a substantially uniform molten mass, thereafter forming very small fluid droplets from the molten mass and projecting the fluid droplets through an inert atmosphere until they are substantially solidified, the small spheroidal particles thus produced having (a), (b), (c), (d) and (e) in substantially solid solution, the quantity, by weight, of (a) in said spheroidal particles being between about 10% and 70% of the weight of the particle, the quantity by weight of (c) being between about 0.5% and 60.0% of the weight of the particle and the quantity by weight of (e) being between about 0.5% and 35.0% of the weight of the particle, the combined weight of (c) and (e) in said particles being between about 20% and about 80% of the total weight of the particle and substantially all of said spheroidal particles being passable through a 10 mesh screen and being retainable on a 100 mesh screen.

2. A stable fat-soluble vitamin-containing composition in which the fat-soluble vitamin is readily available, biologically, said composition comprising (a) a normally solid wax-like material having a melting point of at least 45° C., (b) a fat-soluble vitamin-containing material selected from the group consisting of fat-soluble vitamin A-containing material, fat-soluble vitamin D-containing material and mixtures thereof, (c) an edible surface active material, (d) an edible antioxidant, (e) a hygroscopic polysaccharide which is substantially devoid of surface active properties and which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution and (f) a vegetable flour, said substances (a), (b), (c), (d), (e) and (f) being intimately combined with each other, said composition having been produced by forming (a), (b), (c), (d), (e) and (f) into a substantially uniform molten mass, thereafter forming very small fluid droplets from the molten mass and projecting the fluid droplets through an inert atmosphere until they are substantially solidified, the small spheroidal particles thus produced having (a), (b), (c), (d) and (e) in substantially solid solution forming a continuous phase with (f) suspended therein and comprising up to about 15% by weight of the combined weights of (a), (b), (c), (d) and (e), the quantity by weight, of (a) in said spheroidal particles being between about 10% and 70% of the weight of the particles, the quantity by weight, of (c) being between about 0.5% and 60.0% of the weight of the particle and the quantity by weight of (e) being between about 0.5% and 35.0% of the weight of (c) and (e) in said particles being between about 20% and about 80% of the total weight of the particles and substantially all of said spheroidal particles being passable through a 10 mesh screen and being retainable on a 100 mesh screen.

3. The product of claim 2 wherein (a), the normally solid wax-like material, is a mineral wax.

4. The product of claim 2 wherein (a), the normally solid wax-like material, is a vegetable wax.

5. The product of claim 2 wherein (a), the normally solid wax-like material, is a hydrogenated glyceride having an iodine value which is no greater than 5.

6. The product of claim 2 wherein (c), the edible surface active agent, is lecithin.

7. The product of claim 2 wherein (c), the edible surface active agent, is glyceryl monostearate.

8. A stable fat-soluble vitamin-containing composition in which the fat-soluble vitamin is readily available, biologically, said composition comprising (a) a normally solid wax-like material having a melting point of at least 45° C., (b) a fat-soluble vitamin-containing material selected from the group consisting of a fat-soluble vitamin A-containing material, fat-soluble vitamin D-containing material and mixtures thereof, (c) an edible surface active material, (d) an edible antioxidant, (e) a hygroscopic polysaccharide which is substantially devoid of surface active properties and which is a polysaccharide produced by the controlled and catalyzed polymerization of special corn sugars, said polysaccharide characterized by being water soluble and organic solvent insoluble, having a pH of not less than 3.5 when in the form of a 10% aqueous solution and a viscosity of 20 to 100 poises at 70° F. when in the form of a 40% aqueous solution, and (f) a vegetable flour, said substances (a), (b), (c), (d), (e) and (f) being intimately combined with each other, said composition having been produced by forming (a), (b), (c), (d), (e) and (f) into a substantially uniform molten mass, thereafter forming very small fluid droplets from the molten mass and projecting the fluid droplets through an inert atmosphere until they are substantially solidified, the small spheroidal particles thus produced having (a), (b), (c), (d) and (e) in substantially solid solution forming a continuous phase with (f) suspended therein and comprising up to about 15% by weight of the combined weights of (a), (b), (c), (d) and (e), the quantity, by weight, of (a) in said spheroidal particles being between about 20.0% and 30.0% of the weight of the particles, the quantity, by weight, of (c) being between about 35% and 45% of the weight of the particles and the quantity, by weight, of (e) being between about 15% and 20% of the weight of the particles, the combined weight of (c) and (e) in said particles being between about 55% and 60% of the total weight of the particles and substantially all of said spheroidal particles, being passable through a 10 mesh screen and being retainable on a 100 mesh screen.

References Cited in the file of this patent

UNITED STATES PATENTS

| | | |
|---|---|---|
| 1,764,085 | Placak | June 17, 1930 |
| 2,777,798 | Hochberg | Jan. 15, 1957 |
| 2,827,452 | Schlenk et al. | Mar. 18, 1958 |
| 2,937,091 | Rosenberg | May 17, 1960 |

OTHER REFERENCES

The Merck Index, 5th ed., Merck & Co., Inc., Rahway, N.J., 1940, pages 2 and 316.